United States Patent [19]
Uchida et al.

[11] Patent Number: 5,912,061
[45] Date of Patent: Jun. 15, 1999

[54] UV-RAY SETTING RESIN AND A METHOD FOR MANUFACTURING A MAGNETO-OPTICAL DISK BY THE USE OF THE UV-RAY SETTING RESIN

[75] Inventors: Kiyoshi Uchida, Yamatotakada; Keiji Nishikiori, Daito, both of Japan

[73] Assignee: Matsushita Electric Industrial Co., Ltd., Osaks, Japan

[21] Appl. No.: 08/688,793

[22] Filed: Jul. 31, 1996

[30] Foreign Application Priority Data

Aug. 3, 1995 [JP] Japan ..................................... 7-198661

[51] Int. Cl.$^6$ ........................... B32B 27/08; B32B 27/28; G11B 5/72
[52] U.S. Cl. ................... 428/64.3; 428/447; 428/649 DE
[58] Field of Search ............................ 428/694 DE, 64.3, 428/447

[56] References Cited

U.S. PATENT DOCUMENTS 5,534,322  7/1996  Ueyama et al. ........................ 428/64.2

FOREIGN PATENT DOCUMENTS

| 2165601 | 7/1972 | Germany . |
|---|---|---|
| 63-98857 | 4/1988 | Japan . |
| 64-43834 | 2/1989 | Japan . |
| 3-160642 | 7/1991 | Japan . |
| 4-209346 | 7/1992 | Japan . |
| 5-163564 | 6/1993 | Japan . |
| 5-307777 | 11/1993 | Japan . |
| 2018619 | 10/1979 | United Kingdom . |
| 2018620 | 10/1979 | United Kingdom . |
| 2018621 | 10/1979 | United Kingdom . |
| 2018622 | 10/1979 | United Kingdom . |
| 97/25389 | 7/1997 | WIPO . |

OTHER PUBLICATIONS

Abstract of Jpn. Kodai Tokkyo Koho JP 04036353 (Fujioka et al.), Feb. 1992.
Abstract of Jpn. Kodai Tokkyo Koho JP 08333524 (Kosakai et al.), Dec. 1996.
Abstract of Jpn. Kodai Tokkyo Koho JP 09100326 (Nishimura et al.), Apr. 1997.

*Primary Examiner*—Mary E. Ceperley
*Attorney, Agent, or Firm*—Morrison & Foerster LLP

[57] ABSTRACT

A high quality magneto-optical disk which has the protective coating being excellent in the lubricity, the property of sliding and a long-term reliability includes a UV-ray resin composition comprising photo polymerizable prepolymer, photo polymerization initiator and organic compound having a side chain of fluoroalkyl group or unsaturated aliphatic alkyl group in the end of each molecule. The UV-ray setting resin comprising photo polymerization prepolymer at 30–80 parts by weight; photo polymerization initiator at 10–40 parts by weight; and organic polysiloxane at 0.1–10 parts by weight per 100 parts by weight of (meth-)acrylic ester is applied to approximately 10 μm on the reflection layer 14 by the spincoat method and irradiating the UV-ray (illuminance: 600 mW/cm$^2$, quantity of light: 800 mJ/cm$^2$) at room temperature, thus forming the protective coating.

29 Claims, 5 Drawing Sheets

UV-RAY SETTING RESIN AND A METHOD FOR MANUFACTURING A MAGNETO-OPTICAL DISK BY THE USE OF THE UV-RAY SETTING RESIN

FIELD OF THE INVENTION

The invention relates to a UV-ray setting resin used for a protective coating having the durability of sliding of magneto-optical disk capable of recording by a magnetic field modulation recording method and the magneto-optical disk which is made thereby. The invention also relates to a method for manufacturing the magneto-optical disk.

BACKGROUND OF THE INVENTION

Recently, a magneto-optical disk has drawn much attention as a high density recording medium. The magneto-optical disk typically has a structure including a protective coating layer, a magneto-optical recording layer, a protective layer, a reflection layer and a protecting coating on an optically transparent substrate having concentric circular pre-grooves on its surface. The substrate typically comprises an optically transparent material such as polycaorbonate or the like. The magneto-optical recording layer is formed by thin films comprising amorphous metal alloy (for example, TbFeCo) of rare-earth metal and transition metal having the perpendicular magnetic anisotropy photo magnetic effect. The protective coating layer comprises a silicon nitride film or the like. The protective coating layer is necessary for preventing humidity. The reflecting layer is a thin film comprising an aluminum or an alloy consisting essentially of aluminum. The reflecting layer is employed in order to improve the detection efficiency of producing signals and to control the thermal diffusion. The protective coating is formed from a UV-ray setting resin comprising a photo polymerization initiator, a photo polymerization prepolymer and a (meth-)acrylic ester. The protective coating prevents humidity from effecting the magneto-optical recording layer.

A recording apparatus writes information signals on the magneto-optical disk. The recording apparatus comprises an optical pick-up apparatus irradiating the magneto-optical disk with a laser beam, a magnetic field source apparatus applying the outside magnet field on the magneto-optical disk, a mechanism for rotating the magneto-optical disk, a means for moving the optical pick-up apparatus and a mechanism for moving the magnetic field source device.

The optical pick-up apparatus comprises a light source such as a semiconductor laser and an optical device converging light beams emitted from the light source. This optical pick-up apparatus is located at a predetermined distance from the disk and irradiates the converged light beams onto the magneto-optical recording layer of the magneto-optical disk. The light beams are transmitted through the substrate and irradiated from the back side of the main surface of a substrate of the magneto-optical disk on which the magneto-optical recording layer is formed. In the case where the output beams are demodulated by means of the optical pick-up apparatus, the output emitted from the semiconductor laser is demodulated by means of the driving circuit or the like. The method is called the "light pulse length recording method", in which information signals are written by demodulating the output of the light beam.

The magnetic field source apparatus is typically a magnetic head apparatus comprising a coil for generating a magnet field and a magnetism core to which the coil winds. This magnetic head apparatus is located adjacent to the magneto-optical disk and applies the outside magnetic field to the surface of the magneto-optical layer of the magneto-optical disk from the perpendicular direction. The outside magnetic field is applied from the main surface of the substrate of the magneto-optical disk on which the magneto-optical recording layer is formed. Where the intensity and direction of the outside magnetic field is demodulated with the magnetic head, the electric current supplied to the coil for generating a magnetic field is demodulated by means of the driving circuit or the like. This method is called the "magnet field modulation recording method", in which the information signals are written by modulating the intensity and direction of the outside magnetic field.

The magnet field modulation recording method is superior to the light pulse length recording method in terms of the following points: initialization of arranging the direction of the magnet of the recording film before writing information signals is not necessary; information can be overwritten; and the mark length recording can be done.

The method of direct overwriting information by the light pulse length recording method has been suggested. However, the structure of such magneto-optical disk is complicated because the magneto-optical recording layer comprises a plurality of thin films, thus making the manufacturing process complicated. On the other hand, where the magnet field modulation recording method is employed, direct overwriting can be easily conducted by the means of simple structured magneto-optical disk. The method of writing information by the magnet field modulation recording method is being widely used.

As stated above, the magnet field modulation recording method includes the steps of scanning the converged laser along the pre-groove of the magneto-optical disk; modulating the outside applied magnetic field and changing the direction of magnetization of the portion on which the laser of the magneto-optical recording layer is irradiated. The necessary magnet field to inverse the magnetization of magneto-optical recording layer is relatively high frequency (higher than several hundreds kHz) so as to change the direction and intensity. The generation of such a magnet field is limited to the area adjacent of the magnetic core of the magnetic head apparatus. Consequently, the distance between the laser irradiating section of the magneto-optical recording layer and the magnetic head apparatus section needs to be shortened.

As the means of setting the magnetic head apparatus in this situation, the magnetic head is rotated and placed directly on the magneto-optical recording layer. In other words, the magneto-optical disk is made to be rotating while the pressure welding the magnetic head apparatus onto the magneto-optical disk by means of springs or the like so that the magnetic head apparatus is slided into contact with the magneto-optical disk. Consequently, the distance between the magneto-optical disk and the magneto-optical recording layer is always constant and the distance becomes nearest to the magneto-optical recording layer.

In order to apply the outside magnetic field to the magneto-optical recording layer of the magneto-optical disk, the magnetic head apparatus is slided into contact with the magnetic-optical disk. However, the frictional force generated between the protective coating of the magneto-optical disk and magnetic head apparatus causes a charge increase and breaks the magnetic head and protective coating due to abrasion. Therefore, some means for decreasing the friction force between the protective coating and the magnetic head are reduced.

An example of these conventional techniques is disclosed in Japanese Laid Open Patent No. (Tokkai-Hei) 05-307777.

In this method, the lubrication layer comprising silicon oil is formed on the protective coating of the magneto-optical disk. An application member, such as nonwoven cloth including the lubricant diluted by a solution is put on the surface of the magneto-optical disk on which the protective coating is formed and pressed by the pressing machine, thus forming the lubrication layer on the protective coating of the magneto-optical disk.

Another example is disclosed in Japanese Laid Open Patent No. (Tokkai-Hei) 05-163564. In this method, a lubrication layer comprising a fluorocarbon lubricant containing fluorine having more than one active polar group and carbon as its main components is formed on the surface of the protective coating of a magneto-optical disk. The method includes the steps of applying the solution in which polyfluorocarbon lubricant is dissolved in isopropyl alcohol onto the surface of the protective coating which comprises an organic resin by the spincoat method; and heating the lubrication layer at the temperature of 80° C. to evaporate the solvent. Thus, a lubrication layer is formed.

A third example includes a lubricant in the protective coating of the magneto-optical disk. According to Japanese Laid Open Patent No. (Tokkai-Shou) 64-043834, the structure is disclosed in which macromolecule sheet containing a lubricant comprising a fatty acid or ester or a mixture of them are adhesive-bonded to the protective coating. Moreover, according to Japanese Laid Open Patent No. (Tokkai-Shou) 63-098857, carbon fluoride lubricant is disclosed as a lubricant; according to Japanese Laid Open Patent No. (Tokkai-Hei) 03-160642, functionality silicone compound is disclosed as a lubricant; and according to Japanese Laid Open Patent No. (Tokkai-Hei) 04-209346 a lubricant comprises a perfluoropolyether having isocyanate end groups that is polymerized.

However, the magneto-optical disk manufactured by the above-mentioned three methods capable of the magnetic field modulation recording have some problems, for example, difficulties in manufacturing, and a lack of the durability of sliding.

In the first example, the solvent which is used in diluting the lubricant may react with the polycarbonate of the substrate during volatilizing, thus decreasing the transmissivity of the substrate. Thus, in order to prevent an explosion, an apparatus for collecting the volatilized solvent is necessary. Moreover, an apparatus for pressing is required, thus making it difficult to provide magneto-optical disk at low price.

As to the second conventional example, the magneto-optical disk requires the use of a heating apparatus for evaporating the solvent used for diluting the lubricant and an apparatus for collecting the evaporated solvent used for preventing the explosion.

In the third conventional example, a lubricant of fatty ester, lubricant of carbon fluoride, and lubricant of functionality silicone compound are mixed. The magneto-optical disk of this example can initially decrease the frictional force, but the durability of sliding cannot be maintained due to the increase of the frictional force under the high temperature and high humidity environment.

SUMMARY OF THE INVENTION

The object of the present invention is to provide a UV-ray setting resin composition for forming a protecting coating of a magneto-optical disk, which is excellent in the lubricity, the durability of sliding and a long-time reliability and which can be manufactured at a low cost.

One aspect of the present invention relates to a UV-ray setting resin comprising (a) (meth-) acrylic ester, (b) photo polymerizable prepolymer, (c) photo polymerization initiator, and (d) organic polysiloxane, where (a)–(d) are present in the following amounts (parts by weight):

(a) 100 parts by weight,
(b) 30–80 parts by weight,
(c) 10–40 parts by weight, and
(d) 0.1–10 parts by weight.

The (meth-)acrylic ester can comprise acrylic ester and methacrylic ester. The organic polysiloxane preferably has a molecular structure expressed by Chemical Formula 1 and various kinds of denatures can be made by altering the side chains X and Y.

Chemical Formula 1

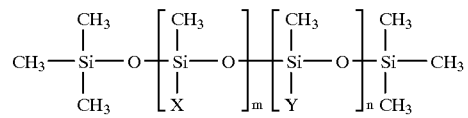

wherein m and n are respectively 0 or an integer not less than 1; and X and Y represent respectively an alkyl group, higher fatty acid ester group, methylcholorinationphenyl group, syrate or branch chain containing an alkyl group whose carbon number of 4–18 or methylphenyl group.

In Chemical Formula 1, it is preferable that the side chain X and Y are an alkyl group, higher fatty acid ester group, methylcholorinationphenyl group, syrate or branch chain containing an alkyl group whose carbon number is 4–18 or methylphenyl group. The side chain X and Y may be the same or may be different. The organic denaturing polysiloxane may be polymethylsiloxane expressed by the Chemical Formula 2 or Chemical Formula 3. The polymethylsiloxane may be employed singly or in combinations thereof.

Chemical Formula 2

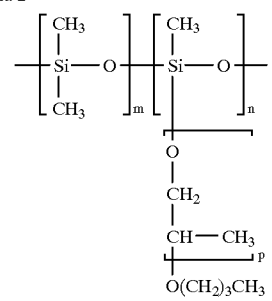

wherein m represents an integer from 8 to 160; n represents an integer from 1 to 20; m and n satisfy m:n=8:1; and p represents an integer from 30 to 40.

Chemical Formula 3

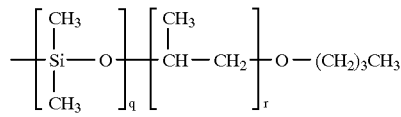

wherein q represents 0 or an integer from 1 to 100; and r represents an integer from 30 to 40.

It is preferable in the above-mentioned UV-ray setting resin that fatty ester is added at 0.1–10 parts by weight per 100 parts by weight of (meth-)acrylic ester. It is further preferable in this case that an organic compound having a fluoroalkyl group side chain or an unsaturated aliphatic alkyl end group is added in an amount of 0.1–10 parts by weight per 100 parts by weight of (meth-)acrylic ester. The fluoroalkyl group herein can be saturated or unsaturated.

It is preferable in the above-mentioned UV-ray setting resin that the photo polymerizable prepolymer is at least one material selected from the group consisting of urethane (meth-) acrylate and epoxy (meth-)acrylate. The urethane (meta-)acrylate herein denotes a material made by reacting an organic compound containing isocyanate group with (meth-)acrylate and polyester comprising the hydroxy group. Moreover, the epoxy (meth-) acrylate herein denotes an ester which is esterificated with the epoxy group of phenol novalac or bishpenol A or alicyclic type epoxy resin. Herein the functional group of epoxy (meth-) acrylate is made to be an acryloyl group.

It is preferable in the above-mentioned UV-ray setting resin that the (meth-)acrylic ester is at least one material selected from the group consisting of lauryl (meth-) acrylate, ethoxydiethyleneglycol (meth-)acrylate, phenoxyethyl (meta-) acrylate, tetrahydrofurfuryl (meth-)acrylate, isobornyl (meta-) acrylate, tricyclodecanyl (meth-)acrylate, triethylene glycol di(meth-)acrylate, neopenthyl glycol di(meta-)acrylate and hexanediol di(meth-)acrylate.

It is preferable in the above-mentioned UV-ray setting resin that the carbon number of the aliphatic alkyl group contained in fatty ester is not less than 10 nor more than 18.

It is preferably in the above-mentioned UV-ray setting resin that the organic compound having a fluoroalkyl group side chain or unsaturated aliphatic alkyl end group (herein "organic compound containing an alkyl group" will be used for an abbreviation) is a fatty acid alkyl diester succinate. The fatty acid alkyl diester succinate can be represented by Chemical Formula 4;

Chemical Formula 4

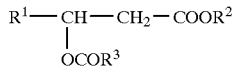

wherein $R^1$ represents an alkyl group whose carbon number is in the range of 1–18; $R^2$ represents an alkyl group whose carbon number is in the range of 1–18 or a fluoroalkyl group whose carbon number is in the range of 1–18; $R^3$ represent H or an alkyl group whose carbon number is in the range of 1–18 or a fluoroalkyl group whose carbon number is in the range of 1–18.

It is preferable in the above-mentioned UV-ray setting resin that the viscosity at the temperature of 25° C. is 20–100 centipoise.

Another aspect of the present invention relates to a method for manufacturing the magneto-optical disk. In this method, a magnetic optical recording layer comprising forming a thin film of inorganic compound on an optically transparent substrate, forming a protective coating layer comprising organic compound on an magnetic optical recording layer, applying UV-ray setting resin composition comprising (a) 100 parts by weight of (meth-) acrylic ester, (b) 30–80 parts by weight of photo polymerizable prepolymer, (c) 10–40 parts by weight photo polymerization initiator, and (d) 0.1–10 parts by weight of organic polysiloxane on the thin film; and curing the resin to form the protective coating layer by irradiating the UV-ray setting resin with the UV radiation which has the illuminance of not less than 300 mW/cm² nor more than 1000 mW/cm², the quantity of light of not less than 500 mJ/cm² nor more than 1500 mJ/cm².

It is preferable in the above-mentioned method that the UV-ray setting resin is applied on the thin film comprising inorganic compound to a 5–50 μm thickness.

It is preferable in the above-mentioned method that fatty ester are contained at 0.1–10 parts by weight per 100 parts by weight of (meth-)acrylic ester.

It is preferable in the above-mentioned method that an organic compound having a fluoroalkyl group side chain or unsaturated aliphatic alkyl end group are contained at 0.1–10 parts by weight per 100 parts by weight of (meth-) acrylic ester.

It is preferable in the above-mentioned method that the photo polymerizable prepolymer is at least one material selected from the group consisting of urethane (meth-) acrylate and epoxy (meth-)acrylate.

It is preferable in the above-mentioned method that the (meth-)acrylic ester is at least one material selected from the group consisting of lauryl (meth-)acrylate, ethoxydiethylene glycol (meth-)acrylate, phenoxyethyl (meta-) acrylate, tetrahydrofurfuryl (meth-)acrylate, isobornyl (meth-) acrylate, tricyclodecanyl (meth-)acrylate, triethylene glycol di(meth-)acrylate, neopenthyl glycol di(meth-)acrylate and hexanediol di(meth-)acrylate.

It is preferable in the above-mentioned method that the carbon number of the aliphatic alkyl group contained in fatty ester is not less than 10 nor more than 18.

It is preferable in the above-mentioned method that the organic compound having a fluoroalkyl group side chain or unsaturated aliphatic alkyl end group is a fatty acid alkyl diester succinate.

It is preferable in the above-mentioned method that the (meth-)acrylic ester is acrylic ester or methacrylate.

It is preferable in the above-mentioned method that the viscosity at the temperature of 25° C. is 20–100 centipoise.

It is preferable in the above-mentioned method that the organic polysiloxane is the material expressed by above-mentioned Formula 1.

Yet another aspect of the present invention relates to a magneto-optical disk. The disk comprises a magnetic optical recording layer comprising thin film of an inorganic compound formed on an optically transparent substrate and a protective coating layer comprising an organic compound formed on the magnetic optical recording layer, where the organic compound is a UV-ray setting resin comprising (a) 100 parts by weight of (meth-) acrylic ester, (b) 30–80 parts by weight of photo polymerizable prepolymer, (c) 10–40 parts by weight photo polymerization initiator, and (d) 0.1–10 parts by weight of organic denaturing polysiloxane.

It is preferable in the above-mentioned magneto-optical disk that the thickness of the protective coating comprising the organic compound is in the range of 5–50 μm.

It is preferable in the above-mentioned magneto-optical disk that an organic compound having a fluoroalkyl group side chain or unsaturated aliphatic alkyl end group is present at 0.1–10 parts by weight per 100 parts by weight of (meth-)acrylic ester.

It is preferable in the above-mentioned magneto-optical disk that the photo polymerization prepolymer is at least one material selected from the group consisting of urethane (meth-) acrylate and epoxy (meth-)acrylate.

It is preferable in the above-mentioned magneto-optical disk that the (meth-)acrylic ester is at least one material selected from the group consisting of lauryl (meth-)acrylate, ethoxydiethyleneglycol (meth-)acrylate, phenoxyethyl (meth-) acrylate, tetrahydrofurfuryl (meth-)acrylate, isobornyl (meth-) acrylate, tricyclodecanyl (meth-)acrylate, triethylene glycol di(meth-)acrylate, neopenthyl glycol di(meth-)acrylate, and hexanediol di(meth-)acrylate.

It is preferable in the above-mentioned magneto-optical disk that the carbon number of aliphatic alkyl group contained in fatty ester is not less than 10 nor more than 18.

It is preferable in the above-mentioned magneto-optical disk that the organic compound having a fluoroalkyl group side chain or unsaturated aliphatic alkyl group end is a fatty acid alkyl diester succinate.

It is preferable in the above-mentioned magneto-optical disk that the (meth-)acrylic ester is acrylic ester or methacrylate.

It is preferable in the above-mentioned magneto-optical disk that the organic polysiloxane is the material expressed by the above-mentioned Formula 1.

DETAILED DESCRIPTION OF THE DRAWING

The photo polymerizable prepolymer is a main component of the protective coating of the magneto-optical disk of the present invention. The resin composition can be easily made into thin film having the thickness of 5–50 μm by adding (meth-)acrylic ester. In other words, the photo polymerizable prepolymer has a high viscosity thus making it difficult to form a thin film of less than 50 μm thickness with a spincoater apparatus which was generally used for forming the protective coating of the optical disk. Consequently, by adding (meth-)acrylic ester comprising at least one less viscous functional group selected from monofunctional group or difunctional group, the protective coating having a low viscosity can be provided. It is thus possible to make thin film of 5–50 μm thickness by the spincoater apparatus. Monofunctional (meth-)acrylic ester is an ester group whose end has no functionality; and difunctional (meth-)acrylic ester is an ester group whose end has a functionality, for example, an —OH group. Moreover, a compound having an acryl group or methacryl group on both ends, for example di(meth-)acrylate, is also included in the difunctional group material.

The organic denaturing polysiloxane contained in the protective coating improves the lubricity, the resistance of frictional damages and the abrasive resistance. The fatty ester is effective for decreasing the friction force. The organic compound containing an alkyl group together with the fatty ester improves the property of sliding under the environment of high temperature and high humidity.

Figure 1:
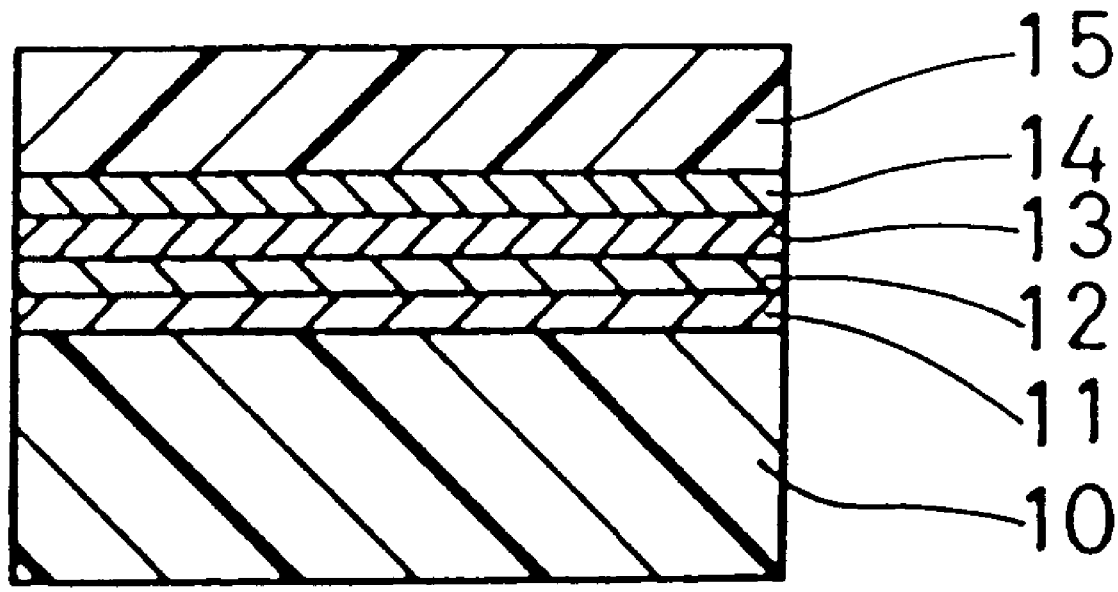
FIG. 1 is a schematic cross sectional view showing the structure of the magneto-optical disk of one example of the present invention.

FIG. 1 is a schematic cross sectional view showing the structure of the magneto-optical disk of one example of the present invention. The magneto-optical disk comprises an optically transparent and disk-shaped substrate 10 which is made by polycarbonate or the like; a first protection layer 11 formed on the substrate 10; a magneto-optical recording layer 12 formed on the first protection layer 11; a second protective coating layer 13 formed on the magneto-optical recording layer 12, a reflection film 14 formed on the second protective coating layer 13 and a protective coating 15 formed on the reflection film 14. The main component of the protection layer 11 and the protection layer 13 are SiN: the main component of the magneto-optical recording layer 12 is TbFeCoCr: and the main component of the reflection film 14 is AlTi.

The substrate 10 is not limited to polycarbonates. The substrate 10 can be formed by a glass or polymethylpentenes or the like, which are optically transparent and excellent in the demential stability. On at least one surface of the substrate 10, grooves or pits having convexity and concavity sections are preferably formed along concentric circles. The grooves formed on the substrate 10 serve as a pre-groove leading the converged laser beams. The pits having convexity and concavity sections are used for recording the location information for moving the laser beams to an optional location. The substrate 10 is made by duplicating the original paste in order to form the grooves or pits having convexity and concavity sections. The original plate can be formed through the sequent process: applying the photo sensitive resin onto the disk-state glass plate whose surface is clean and transparent by the spinner method or the like, burning the region of the photo sensitive resin on which the grooves or pits having convexity and concavity sections are formed by the light irradiation, and galvaniaing by developing to form the master plate; duplicating the mother plate from the master plate; and duplicating the stamper from the mother plate. The substrate 10 can be formed by injection molding the polycarbonate which is a component material of substrate 10 into the mold and the space made with the stamper in the mold. The size of the substrate 10 is preferably 65–90 mm in the diameter and 0.5–1.2 mm in the thickness.

The first protective layer 11 and the second protective layer 13 play a role in protecting the magneto-optical recording layer 12 from humidity. Other than this role, the first protective layer 11 has functions including protecting the substrate 10 from the heat generated when the converged laser beams are irradiated to the magneto-optical recording layer 12, and adjusting the laser beams so as to be efficiently absorbed and reflected at the magneto-optical recording layer 12. Besides the main function of protective recording layer 12 from humidity, the second protective layer 13 has a function of adjusting the laser beams so as to be effectively absorbed and reflected at the magneto-optical recording layer 12 and adjusting the situation of heat diffusion to efficiently heat the portion of the magneto-optical recording layer 12.

The first protective layer 11 and the second protective layer 13 can be formed from thin films of materials that can secure the optical transparency. Such materials include, besides SiN; a metal oxide, such as $SiO_2$, $Al_2O_3$, $Ta_2O_5$, or $TiO_2$; a metal nitride, such as AlN; an inorganic carbide, such as TiC, SiC; AlTaO; ZnS; ZnSe; $ZnSSiO_2$; $ZnSeSiO_2$; the complex compound of the above-mentioned metal oxide and the metal nitride.

The magneto-optical recording layer 12 is formed by materials having perpendicular magnetic anisortropy and the photo magnetic effect. The thin film that can be used includes the amorphous metal alloy (for example, TbFe, TbFeCo, DyFeCo) of the rare-earth metal and the transition metal, or thin film made by magnet materials having the perpendicular magnetization (for example, MnBi or PtCo). The layer can also be formed with thin films of each alloy or each unit metal.

The reflection film 14 is used for reflecting laser beams transmitted by the magneto-optical recording layer 12. The reflection layer 14 is used in the formation of thin film comprising Au, Ag, Pt, Al or alloys thereof. If necessary, small quantity of Ta, Ti, Cr, Zr, V, Pb, Mo, Pd or the like may be added.

The first protective layer 11, the second protective layer 13, the magneto-optical recording layer 12 and the reflection film 14 are formed, for example, by a vacuum deposition method or a sputtering method. It is preferable that the thickness of the first protective layer 11 is 80–120 nm; that of the magneto-optical recording layer 12 is 10–50 nm; that of the second protective layer 13 is 5–30 nm; and that of the reflection film 14 is 20–60 nm.

The protective coating 15 has functions including protecting the reflection film 14 from mechanical damages; preventing humidity or the like from directly contacting with the reflection film 14; decreasing the friction force against sliding magnetic head without bad influence on the rotary operation; and preventing the magnetic head and the protective coating 15 from breaking down due to an abrasion. The protective coating 15 is formed by applying the UV-ray setting resin onto the reflection film 14 by a spincoat method or a screen printing method; and then by irradiating with a UV radiation ray.

The components of the UV-ray setting resin of this example will be explained in detail.

Photo polymerizable prepolymer, which is one component of the UV-ray setting resin composition forming the protective coating 15 of magneto-optical disk of the present invention, is a main component of the protective coating 15. As the photo polymerizable prepolymer, materials such as polyester acrylate, silicon acrylate, melamineacrylate, urethane acrylate, epoxy acrylate or the like can be used. However, it is preferable that urethane acrylate and epoxy acrylate are used, which provide the hardness and the flexibility. More preferably, epoxy acrylate can be used to obtain a low viscosity UV-ray setting resin.

Monofunctional acrylic ester, one component of the UV-ray setting resin composition for forming the protective coating 15 of the magneto-optical disk of the present invention, is used in order to decrease the viscosity of photo polymerizable prepolymer and to secure the adhesion between the reflective film 14 and the protective coating 15. The materials which can be used for the monofunctional acrylic ester include; 2-hydroxyethyl acrylate, 2-hydroxyprophyl acrylate, laurylmethacrylate, diethylaminoethyl methacrylate, methyl methacylate, n-dimethyl methacrylate nonylphenoxyethyl acrylate, tetrahydrofurfuryl oxyethyl acrylate, cyclohexaneoxyethyl acrylate, tetrahydrofurfuryl oxyehexanoid acrylate, 1,3-dioxolane acrylate, tricychlodecanyl acrylate, isoamyl acrylate, stearyl acrylate, butoxyethyl acrylate, methoxytriethylene glycol acrylate, methoxydipropylen glycol acrylate, phenoxypolyethylene glycol acrylate, isobornyl acrylate, laurylacrylate, ethoxydiethyleneglycol acrylate, penoxypolyethyl acrylate, tetrahydrofurfuryl oxyehexanoid acrylate, isobornyl acrylate, tricyclodecanyl acrylate, or the like. In order to improve weather resistance and the adhesivity, it is preferable that one or combination of the materials selected from laurylacrylate, ethoxydiethyleneglycol acrylate, penoxypolyethyl acrylate, tetrahydrofurfuryl oxyehexanoid acrylate, isobornyl acrylate, and trichlorodecanyl acrylate.

Difunctional acrylic ester, one component of the UV-ray setting resin composition for forming the protective coating 15 of the magneto-optical disk of the present invention is used in order to decrease the viscosity of photo polymerizable prepolymer and to promote the polymerization reaction. The materials which can be used for the difunctional acrylic ester include; 1,3-butanediol diacrylate, 1,4-butanediol diacrylate, 1,6-hexanediol diacrylate, diethylene glycol diacrylate, polyethylene glycol diacrylate, tricyclodeandimethylol diacrylate, triethylene glycol diacrylate, neopenthyl glycol diacrylate, hexanediol diacrylate, or the like. In order to promote diluting, it is preferable that triethylene glycol diacrylate, neopenthyl glycol diacrylate, hexanediol diacrylate can be employed singly or in combination.

Where an acrylic ester is employed, the monofunctional acrylic ester and the difunctional acrylic ester may be used singly, or in combinations thereof. Moreover, methacrylate in which H- substitutes for methyl group can be used for the acrylic ester. Furthermore, if the viscosity of the UV-ray setting resin at a temperature of 25° C. is not more than 100 centipoise (meth-) acrylic ester having more than three functional groups can be added. The materials which can be added as a (meth-)acrylic ester having more than three functional groups include; trietitorimethylporpane triacrylate, pentaerythritol triacrylate, pentaerythritol tetraacrylate, dipentaerythritol hexa acrylate, dipentaerythritol monohydroxy penta acrylate or the like.

Fatty ester, one component of the UV-ray setting resin composition for forming the protective coating 15 of the magneto-optical disk of the present invention, is used in order to decrease the friction force on the surface of the protective coating 15. The ester bond is directed by the reaction between aliphatic and alcohol to form fatty ester. The aliphatic acid includes butyric acid, n-pentanoic acid, caproic acid, enatic acid, caprylic acid, pelargonic acid, capric acid, lauric acid, myristic acid, palmitin acid, stearic acid, oleic acid, adipic acid, sebacic acid, maleic acid, or the like. In particular, fatty ester of 0–18 carbon atoms via a reaction between alcohol and acid such as capric acid, lauric acid, myristic acid, palmitin acid, stearic acid, oleic acid are preferably used.

The organic compound including alkyl group is not limited to fatty acid alkyl diester succinates. Fatty acid alkyl monoester succinates and fatty acid alkyl triester succinates can also be used.

Photo polymerization initiator, one component of the UV-ray setting resin composition for forming the protective coating 15 of the magneto-optical disk of the present invention, includes the following materials: the acetophnone system such as acetophenone, trichloro-acetophenone, dichloro-acetophenone, tertbutyltrichloro-acetophenone, 2,2-diethoxyacetophenone, 4-dialkylamino-acetophenone, p, p'-dimethylaminoacetophenone, p-dimethylaminoacetophenone, or the like; the benzophenone system such as benzophenone, 2-cholorobenzophenone, p, p'-dibenzophenone, p, p'-bisdiethylamino benzophenone, 4,4-bisdimethylamino benzophenone(Michlaer's ketone) or the like; the ketone system such as benzil, benzildimethylketal, phenylmethoxyketone, 1-hydroxycyclohexylphenylketon, or the like; the benzoin system such as benzoin, benzoylbenzonate, benzoylperoxide, benzoin isobutylether, benzoin n-butylether, benzoin methylether, benzoin ethylether, benzoin isopropylether, benzoin-n-propylether or the like; thioxanthone system such as thioxanthone, 2-chlorothioxanthone, methylbenzoylformation, α-acyloxim ester, 2,4-diethylthioxanthone, 2-cholorothioxanthone, 2-methylthioxanthone or the like; biacetyl; tetramethylthiuramsulfide; azobisisobutyronitrile; di-tert-butylperoxide; 2-hydroxy-2-methy-1-phenylpropane-1-on; 1-(4-propinophenyl)-2-hydroxy-2-methypopane-1-on; 2,2-dimethoxy-1,2-diphenylethane-1-on or the like. The above-mentioned materials can be used singly or in combination. From the viewpoint of compatibility to the wavelength of light absorption, it is preferable that acetophenone, p, p'-dimethylaminoacetophenone, 2,2-diethoxyacetophenone, benzophenone, 4,4-bisdimethylamino benzophenone, benzil, benzildimethylketal, phenylmethoxyketone, 1-hydroxycyclohexylphenylketon, benzoin, benzoin isobutlether, biacetyl, tetramethylthiuramsulfide, azobisisobutyronitrile, di-tert-butylperoxide, thiozanthone, 2,4-diethylthioxanthone, 2,2-dimethoxy-1,2-diphenylethane-1-on or the like can be used alone or in combinations thereof.

As stated above, the UV-ray setting resin comprising photo polymerizable prepolymer, acrylic ester, organic denaturing polysiloxane, photo polymerization initiator and if necessary, fatty ester and organic compound including alkyl group is applied onto the reflection film 14 by a spincoat method. Then the UV-ray setting resin is irradiating thereon, thus forming the protective coating. The spincoat method is conducted as following steps: appropriate quantity of UV-ray setting resin is dropped on the middle of the coated surface; and rotating the coated surface at relatively high speed so as to spread the dropped UV-ray setting resin to the whole surface of the coated surface. A suitable spincoat apparatus comprises a nozzle apparatus for dropping a resin, a tank for storing the resin, a pipe for moving the resin from the tank to the nozzle apparatus, a controlling apparatus for controlling the quantity of the resin dropped from the nozzle apparatus, a rotation table apparatus for rotating the coated surface, an outer wall for covering the rotation table apparatus, and a collecting apparatus for collecting the resin attached to the outer wall.

When the protective coating 15 of the magneto-optical disk is formed, the substrate 10 on which the first protective layer 11, the magneto-optical recording layer 12, the second protective layer 13, the reflection film 14 are sequently formed is located in a way which the nozzle apparatus and the reflection film 14 are facing each other and the nozzle in the nozzle apparatus is located in adjacent to the center of the substrate 10. Next, the UV-ray setting resin is dropped on the substrate with the nozzle while rotating at a speed of 10–100 times rotary motion per minute. Then, the rotation is conducted at a speed of 2000–5000 rotary motions per minute so as to spread the UV-ray setting resin which is put in the middle of the substrate 10 to the outer direction by the use of centrifugal force. Consequently, the thickness of the reflection film 14 on the substrate 10 turns out to be 5–50 $\mu$m and the application is completed.

In this method, more than 95% of the UV-ray setting resin which is dropped on the substrate 10 are spread to the outer wall due to the centrifugal force, thus meaning that less than 5% of UV-ray setting resin is applied. Therefore, in order to use the UV-ray setting resin effectively, the UV-ray setting resin attached to the outer wall needs to be collected. In order to efficiently collect, it is preferable that the viscosity of the UV-ray setting resin be low. If the viscosity of the UV-ray setting resin is more than 100 centipoise, the probability of occurring problems such as jamming or entering of bubble when carrying or filtering the UV-ray setting resin which is attached to the outer wall increases.

In order not to have the viscosity of 100 centipoise or above, in this example, the UV-ray setting resin preferably comprises photo polymerizable prepolymer at 30–80 parts by weight, photo polymerization initiator at 10–40 parts by weight, and organic polysiloxane at 0.1–10 parts by weight per 100 parts by weight of the (meth-)acrylic ester. In addition to the above-mentioned mixture, fatty ester may be added at 0.1–10 parts by weight. In the case where fatty ester is added, 0.1–5 parts by weight of organic compound containing alkyl group may be further added. The organic denaturing polysiloxane is used to secure the lubricity and the durability for abrasiveness of the protective coating 15; the fatty ester is used to decrease the friction force of the surface of the protective coating 15; the organic compound containing alkyl group is used to improve the sliding property under the environment of the high temperature and high humidity by the use of compound effect with fatty ester. By means of the multiple effect of each material, the lubricity and the property of the sliding of the surface of the protective coating 15 can be secured. Therefore, the balance of each component is important. The component of the resin can be analyzed by the nuclear magnetic resonance method or the like unless the resin is hardened. If the photo polymerization prepolymer is less than 30 parts by weight per 100 parts by weight of (meth-)acrylic ester, the mechanical intensity of the protective coating 15 is insufficient. On the contrary, if the photo polymerization prepolymer is more than 80 parts by weight per 100 parts by weight of (meth-) acrylic ester, the viscosity of the UV-ray setting resin is more than 100 centipoise. Also if the photo polymerization initiator is less than 10 parts by weight per 100 parts by weight of (meth-)acrylic ester, polymerization reaction of photo polymerization prepolymer is not conducted satisfactrily. If the photo polymerization initiator is more than 40 parts by weight per 100 parts by weight of (meth-) acrylic ester, the photo polymerization initiator remains in the protective coating 15, causing a delay in hardening resins. In addition, if the total parts by weight of organic denaturing polysiloxane, fatty ester and organic compound containing alkyl group is more than 25 parts by weight, the lubricant (a compound of the organic denaturing polysilozane, fatty ester and organic compound containing alkyl group) which is present on the surface of the protective coating 15 is excessive thus increasing the friction force.

EXAMPLE 1

For the photo polymerizable prepolymer, epoxy acrylate was used, which was bisphenol A diepoxy acryl acid additional product expressed by the Chemical Formula 5. For the monofunctional acrylic acid, tetrahydrofurfuryl acrylate expressed by the Chemical Formula 6 and tricyclodecanyl acrylate expressed by the Chemical Formula 7 were used. For difunctional acrylic ester, neopenthyl glycol diacrylate expressed by the Chemical Formula 8 was used. For the organic polysiloxane, the mixture of two kinds of polymethylsiloxane (GLANOL B-1484, product by KYOEISHA CHEMICAL CO.,LTD.) expressed by the Chemical Formula 9 and Chemical Formula 10 were used. For the photo polymerization initiator, benzophenone and p',p-dimethylaminocacetophenone expressed by the Chemical Formula 11 was used. The above-mentioned materials were mixed as the following ratio so as to adjust the UV-ray setting resin.

Chemical Formula 5

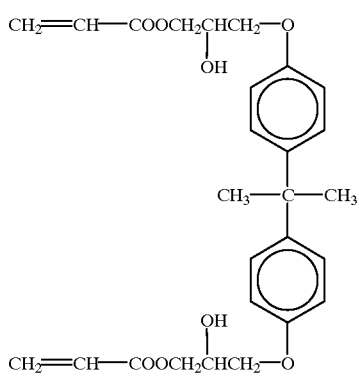

Chemical Formula 6

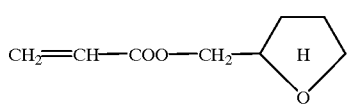

Chemical Formula 7

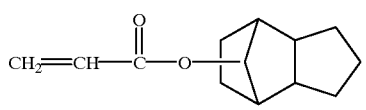

Chemical Formula 8

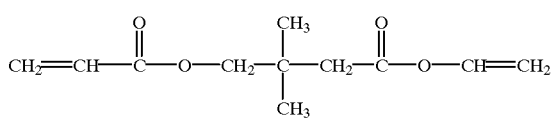

Chemical Formula 9

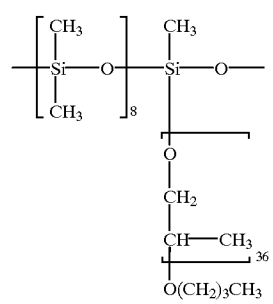

Chemical Formula 10

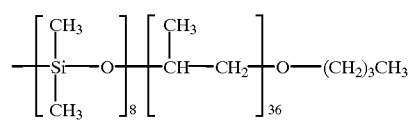

Chemical Formula 11

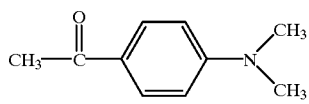

Chemical Formula 12

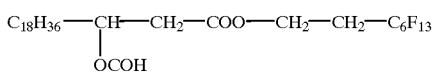

In this example, the UV-ray setting resin was formed by altering the mixing ratio of organic polysiloxane as follows. The viscosity of the resin at the temperature of 25° C. was 35 centipoise.

(a) acrylic ester 100 parts by weight (tetrahydrofurfuryl acrylate: 14 parts by weight, trichlorodecanyl acrylate: 54 parts by weight, neopenthyl glycol diacrylate: 32 parts by weight)

(b) photo polymerizable prepolymer 38 parts by weight (c) photo polymerization initiator 15 parts by weight (benzophenone: 10 parts by weight, p', p-dimethylaminoacetophenone5 parts by weight)

(d) polymethyl siloxane parts by weight were altered as 0, 0.5, 1.0, 1.7, 3.1, 4.6, 6.3, and 8.8.

In the magneto-optical disk of this example, 95 nm thick first protective layer 11, 25 nm thick magneto-optical recording layer 12, 20 nm thick second protective layer 13, 30 nm thick reflection layer 14 were sequently formed on the surface of the polycarbonate substrate having a diameter of 70 mm and a thickness of 1.2 mm by the sputtering method. Then, the UV-ray setting resin was applied to the reflection layer 14 to 10 $\mu$m thickness by the spincoat method and UV-ray irradiation illuminance: 600 mW/cm$^2$, quantity of light: 800 mJ/cm$^2$) was conducted to form the protective coating 15.

Figure 2:
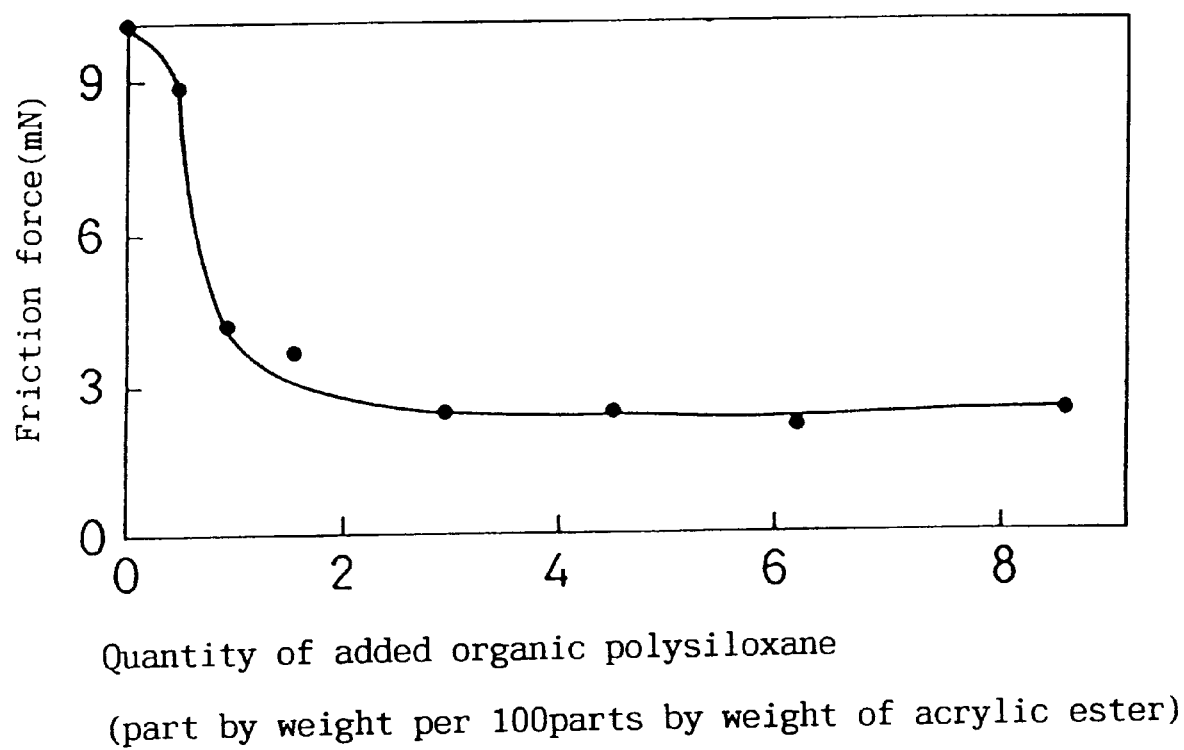
FIG. 2 is a graph showing the relation between the composition and the friction force of organic denaturing polysiloxane of one example of the present invention.

FIG. 2 shows the dependency of the friction force of the protective coating 15 on the composition of organic polysiloxane. The friction force was measured when the denaturing polyamide is applied to the protective coating 15 at an intensity of 10 mN and the relative speed of protective coating 15 and denaturing polyamide was controlled to 1.2 m/second. Moreover, the measurement was conducted under the condition where the temperature was 20° C. and the relative humidity was 50% RH. The Max value during one-hour sliding was measured.

As is apparent from FIG. 2, the friction force rapidly decreased when the additional quantity of organic polysiloxane was 0.5 parts by weight. The friction force continued to decrease until the additional quantity of organic polysiloxane was 2 parts by weight. This effect maintained until the additional quantity became 8.8 parts by weight.

EXAMPLE 2

In adjusting the UV-ray setting resin of this example, as a fatty ester stearic acid n-butyl was employed besides the components which were used in the Example 1. The adjustment was conducted while only the mixing ratio of stearic acid n-butyl was altered as follows. The viscosity of the resin was 35 centipoise at the temperature of 25° C.

| | |
|---|---|
| (a) acrylic ester (tetrahydrofurfuryl acrylate: 14 parts by weight, trichlorodecanyl acrylate: 54 parts by weight, neopenthyl glycol diacrylate: 32 parts by weight) | 100 parts by weight |
| (b) photo polymerizable prepolymer | 38 parts by weight |
| (c) photo polymerization initiator (benzophenone: 10 parts by weight, p',p-dimethylaminopropiophenone: 5 parts by weight) | 14 parts by weight |
| (d) polymethyl siloxane | 6 parts by weight |
| (e) stearic acid n-butyl parts by weight were altered as 0, 3.3, 4.9, 6.6, 8.2, and 9.8. | |

The above-mentioned resin was applied to the reflection film 14 to an approximately 10 $\mu$m thickness by the same method as in Example 1, and then UV-ray irradiation (illuminance: 600 mW/cm$^2$, quantity of light: 800 mJ/cm$^2$) was carried out at the ordinary temperature so that the protective coating was formed.

Figure 3:
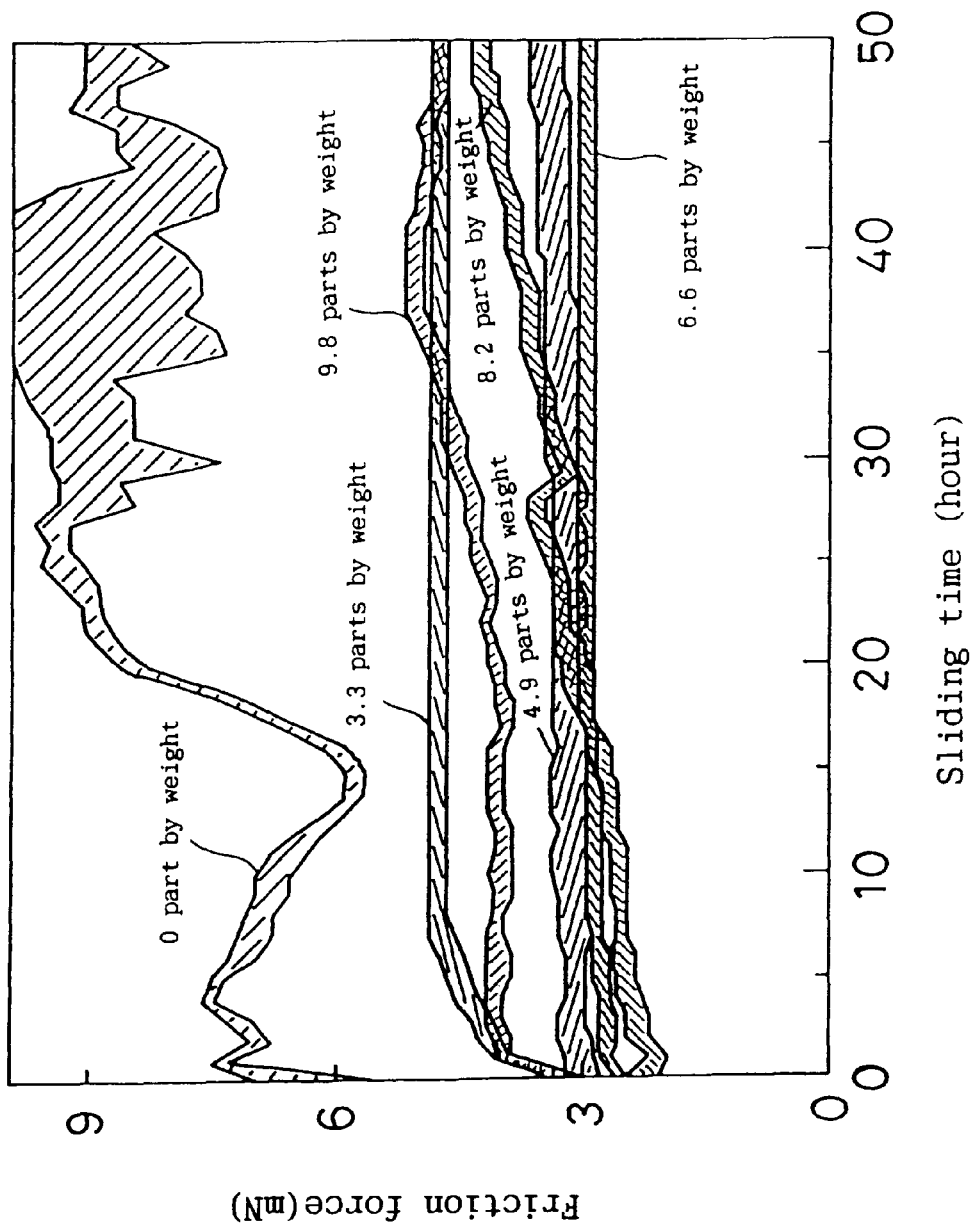
FIG. 3 is a graph showing the relation between the composition and the friction force of fatty ester of one example of the present invention.

FIG. 3 shows the change in the Max value of friction force of the protective coating 15 during a predetermined sliding time under the environment where the temperature was 40° C. and the relative humidity was 90% RH. As is apparent from FIG. 3, when the additional quantity of the fatty ester was in the range of 3.3–9.8 parts by weight, the stable low friction force could be obtained.

EXAMPLE 3

In adjusting the UV-ray setting resin of this example, as an organic compound containing alkyl group, a fatty acid alkyl diester succinate expressed by the Chemical Formula 12 was employed besides the component which was used in Example 2. The adjustment was conducted while only the mixing ratio of the fatty acid alkyl diester succinate was altered as follows.

Chemical Formula 12

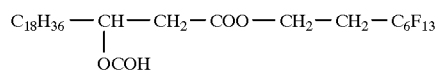

The viscosity of the resin at the temperature of 25° C. was 35 centipoise.

| | |
|---|---|
| (a) acrylic ester (tetrahydrofurfuryl acrylate: 14 parts by weight, trichlorodecanyl acrylate: 54 parts by weight, neopenthyl glycol diacrylate: 32 parts by weight) | 100 parts by weight |
| (b) photo polymerizable prepolymer | 38 parts by weight |
| (c) photo polymerization initiator (benzophenone: 9 parts by weight, p',p-dimethylaminopropiophenone: 4 parts by weight) | 13 parts by weight |
| (d) polymethyl siloxane | 7 parts by weight |
| (e) stearic acid n-butyl | 7 parts by weight |
| (f) fatty acid alkyl diester succinate: parts by weight were altered as 0, 0.8, 3.3, 4.1, and 4.9. | |

The above-mentioned resin was applied to the reflection film 14 to an approximately 10 µm thickness by the same method as in Example 1, and then UV-ray irradiation (illuminance: 600 mW/cm$^2$, quantity of light: 800 mJ/cm$^2$) was conducted at the ordinary temperature so that the protective coating was formed.

Figure 4:
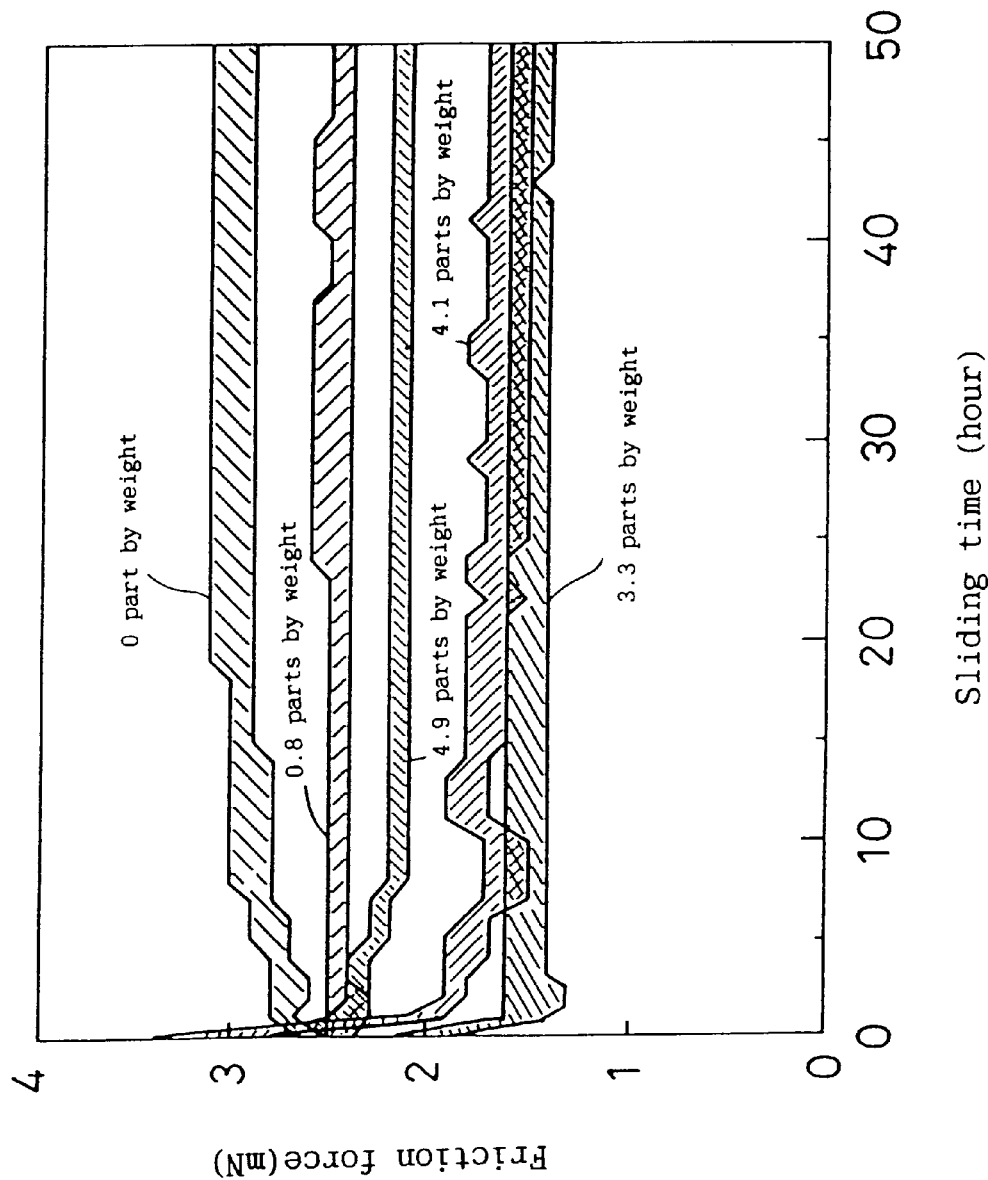
FIG. 4 is a graph showing the relation between the composition and the friction force of the organic compound containing the alkyl group of protective coating of one example of the present invention.

FIG. 4 shows the change in the Max value of friction force of the protective coating 15 during a certain sliding time under the environment where the temperature was 40° C. and the relative humidity was 90%. As is apparent from FIG. 4, when the additional quantity of the fatty ester was 0.8–4.9 parts by weight, the reduced effect of the friction force could be obtained.

EXAMPLE 4

The carbonate substrate 10 was made by the injection molding method as in Example 1, and the first protecting layer 11, the magneto-optical recording layer 12, the second protection layer 13 and the reflection film 14 were formed in the same way as in Example 1 by the sputtering method. The UV-ray setting resin comprising the same component as Example 3 and 4 parts by weight of fatty acid alkyl diester succinate was put in adjacent of the surface of a substrate on which the reflection film 14 was formed. The UV-ray setting resin was dropped and put on the concentric circular, then applied to approximately 10 µm thickness on the reflection film 14 by rotating the coated surface and spreading the UV-ray setting resin to the whole surface thereof at a relatively high speed (2000–5000 times rotary motions per minute). Then the UV-ray setting resin on the reflection layer 14 was irradiated with UV-ray same as in Example 1 so as to form the protective coating 15.

Figure 5:
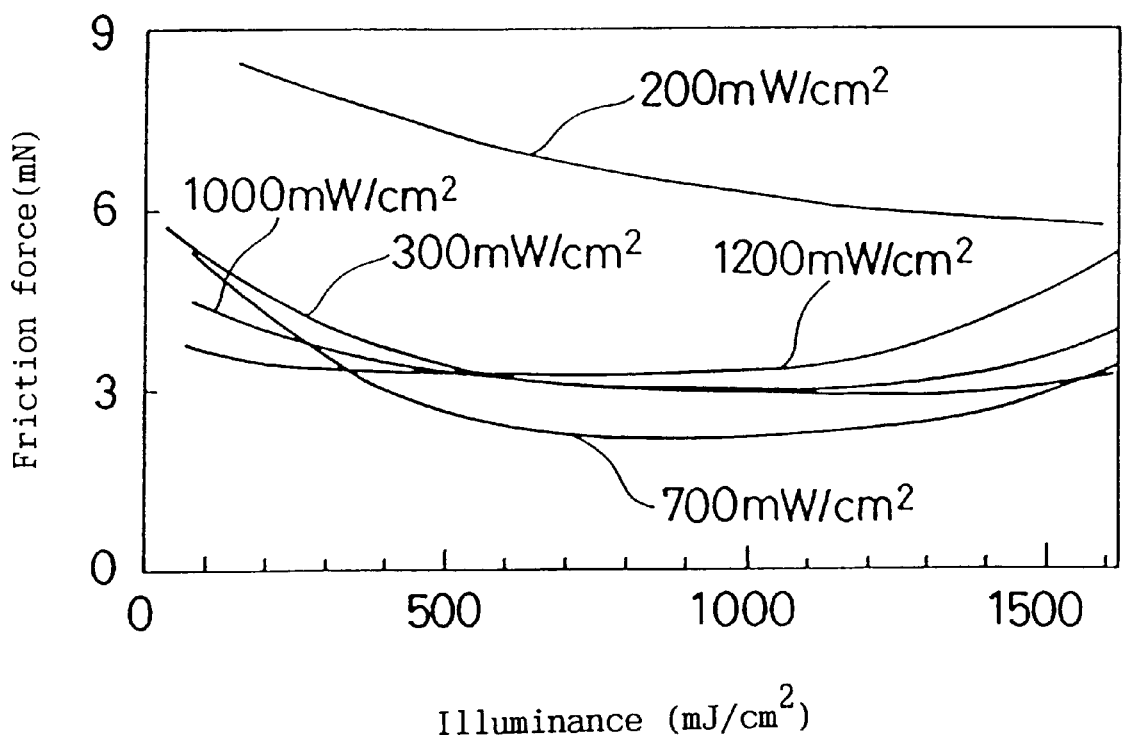
FIG. 5 is a graph showing the change in the friction force to the quantity of light and the illuminance of UV-ray of the protective coating of one example of the present invention.

FIG. 5 shows the change in the friction force of protective coating 15 according with the quantity of light and the illuminance. The illuminance and quantity of light were measured in the wave length in the range of 330–370 nm. The friction force was measured when the denaturing polyamide was applied by pressing at the intensity of 10 mN onto the protective coating 15 and the relative speed of denaturing polyamide were controlled to be 1.2 m/second. Moreover, the ultraviolet lamp used for the irradiation was a high pressure mercury lamp. As is apparent from FIG. 5, when the illuminance of UV-ray was not less than 300 mV/cm$^2$ nor more than 1000 mV/cm$^2$, and the quantity of UV-ray light received by the UV-ray setting resin was not less than 500 mJ/cm$^2$ nor more than 1500 mJ/cm$^2$.

In this example, the first protective layer 11 comprising SiN as a main component, the magneto-optical recording layer 12 comprising TbFeCoCr as a main component, the reflection layer 14 comprising AlTi as a main component were sequently formed on the substrate 10. However, any film structure that comprises the magneto-optical recording layer 12 can be employed.

EXAMPLE 5

The same compound as Example 1, (b) photo polymerizable prepolymer, (c) photo polymerization initiator, and (d) organic polysiloxane were added and mixed at parts by weight respecting shown in Table 1 per to (a) (meth-) acrylic ester at the 100 parts by weight (tetrahydrofurfuryl acrylate: 14 parts by weight, trichlorodecanyl acrylate: 54 parts by weight, neopenthyl glycol diacrylate: 32 parts by weight), to form the resin composition. Then the UV-ray setting resin was applied to approximately 10 µm thickness on the reflection layer 14 by the spincoat method same as Example 1, and then UV-ray setting resin was irradiated with UV-ray (illuminance:600 mW/cm$^2$, quantity of light:800 mJ/cm$^2$) at the ordinary temperature to form the protective coating 15.

TABLE 1

| experiment No. | resin composition (part by weight) | | | | friction force*5 (mN) | friction force (under high humidity)*6 (mN) | over-all evaluation*7 |
|---|---|---|---|---|---|---|---|
| | (a)*1 | (b)*2 | (c)*3 | (d)*4 | | | |
| 1 | 100 | 27 | 15 | 6 | 9 | 10 | X |
| 2 | 100 | 31 | 15 | 6 | 6 | 7 | ◯ |
| 3 | 100 | 42 | 15 | 6 | 3 | 3 | ◉ |
| 4 | 100 | 68 | 15 | 6 | 3 | 3–4 | ◉ |
| 5 | 100 | 78 | 15 | 6 | 8 | 14 | ◯ |
| 6 | 100 | 83 | 15 | 6 | 14 | 25 or more | X |
| 7 | 100 | 42 | 8 | 6 | 16 | 20 | X |
| 8 | 100 | 42 | 11 | 6 | 3 | 5 | ◯ |
| 9 | 100 | 42 | 22 | 6 | 3 | 3–4 | ◉ |

TABLE 1-continued

| experiment No. | resin composition (part by weight) | | | | friction force*5 (mN) | friction force (under high humidity)*6 (mN) | over-all evaluation*7 |
|---|---|---|---|---|---|---|---|
| | (a)*1 | (b)*2 | (c)*3 | (d)*4 | | | |
| 10 | 100 | 42 | 30 | 6 | 3 | 3 | ⊚ |
| 11 | 100 | 42 | 39 | 6 | 6 | 9 | ○ |
| 12 | 100 | 42 | 42 | 6 | 13 | 25 | X |
| 13 | 100 | 42 | 15 | 0 | 11 | 18 | X |
| 14 | 100 | 42 | 15 | 0.1 | 8 | 9 | ○ |
| 15 | 100 | 42 | 15 | 2 | 3 | 3 | ⊚ |
| 16 | 100 | 42 | 15 | 9 | 3 | 4 | ⊚ |
| 17 | 100 | 42 | 15 | 9.8 | 6 | 6 | ○ |
| 18 | 100 | 42 | 15 | 11 | 10 | 13 | X |

Remarks
*1(a) comprises 100 parts by weight of acrylic ester (tetrahydrofurfuryl acrylate: 14 parts by weight, trichlorodecanyl acrylate: 54 parts by weight, neopenthyl glycol diacrylate: 32 parts by weight)
*2(b) comprises photo polymerizable prepolymer.
*3(c) comprises photo polymerization initiator.
*4(d) comprises polymethyl siloxane.
*5 The friction force was measured by the method described in Example 1. The measurement was carried out at the temperature of 20° C., humidity of 50% RH, and the Max value for one-hour sliding time was measured.
*6 The friction force under high humidity was measured by the method described in Example 2. The measurement was carried out at the temperature of 40° C., humidity of 90% RH, and the Max value for fifty-hour sliding time was measured.
*7 ⊚: Excellent
○: Good. Sufficient for practical use.
X: Insufficient for practical use.

As is apparent form Table 1, the magneto-optical disk of experiments No. 2–5, and 8–11 of this example are excellent in terms of a lubricity of the surface of the protective coating and also excellent in the property of sliding under the high temperature and high humidity, and the long-term reliability can be obtained.

As stated above, the UV-ray setting resin of the present invention comprises photo polymerizable prepolymer, photo polymerization initiator, monofunctional or difunctional (meth-)acrylic ester and organic denaturing polysiloxane. If necessary the UV-ray setting resin of the present invention comprises fatty ester and organic compound having a side chain of saturated or unsaturated fluoroalkyl group or unsaturated aliphatic alkyl group in the end of the molecule. Consequently, the magneto-optical disk can be provided which has the protective coating being excellent in terms of a lubricity and the property of sliding under the high temperature and high humidity. The magneto-optical disk of the present invention can also have the long-term reliability. Moreover, the present invention provide the magnetic optical disk, wherein the adhesion between the protective coating and the reflection layer is excellent and the durability of sliding is excellent due to the decrease in the friction force.

Moreover, the manufacturing method of applying and hardening the UV-ray setting resin permits providing the high quality magneto-optical disk at a low price by decreasing the cost of manufacturing apparatus which was required in the conventional method.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:
1. A UV-ray setting resin forming mixture for manufacturing a magneto-optical disk, said mixture comprising:
(a) 100 parts by weight of (meth-)acrylic ester,
(b) 30–80 parts by weight of a photo polymerizable prepolymer,
(c) 10–40 parts by weight of a photo polymerizable initiator and
(d) 0.1–10 parts by weight of an unreactive organic polysiloxane,
said unreactive organic polysiloxane being represented by a chemical formula:

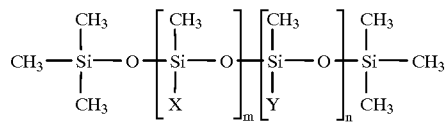

wherein m and n are respectively 0 or an integer not less than 1; and X and Y represent respectively an alkyl group, a higher fatty acid ester group, a methylcholorophenyl group, a straight or branched chain alkyl group whose carbon number is 4–18 or a methylphenyl group.

2. The UV-ray setting resin composition according to claim 1, which further comprises a fatty ester in an amount of 0.1–10 parts by weight per 100 parts by weight of (meth-)acrylic ester.

3. The UV-ray setting resin composition according to claim 1, which further comprises an organic compound having a fluoroalkyl group side chain or unsaturated aliphatic alkyl end group present in an amount of 0.1–10 parts by weight per 100 parts by weight of (meth-)acrylic ester.

4. The UV-ray setting resin composition according to claim 1, wherein the photo polymerizable prepolymer is at least one material selected from the group consisting of urethane (meth-) acrylate and epoxy (meth-)acrylate.

5. The UV-ray setting resin composition according to claim 1, wherein the (meth-)acrylic ester is at least one material selected from the group consisting of lauryl (meth-)acrylate, ethoxydiethyleneglycol (meth-)acrylate, phenoxyethyl (meth-)acrylate, tetrahydrofurfuryl (meth-)acrylate, isobornyl (meth-)acrylate, tricyclodecanyl (meth-)acrylate, triethylene glycol di(meth-)acrylate, neopentyl glycol di(meth-)acrylate and hexanediol di(meth-)acrylate.

6. The UV-ray setting resin composition according to claim 2, wherein the carbon number of an aliphatic alkyl group contained in fatty ester is not less than 10 nor more than 18.

7. The UV-ray setting resin composition according to claim 3, wherein the organic compound having a fluoroalkyl group side chain or unsaturated aliphatic alkyl end group is fatty acid alkyl diester succinate.

8. The UV-ray setting resin composition according to claim 1, wherein the (meth-)acrylic ester is an acrylic ester or methacrylate.

9. The UV-ray setting resin composition according to claim 1, wherein the viscosity at the temperature of 25° C. is 20–100 centipoise.

10. A method of manufacturing a magneto-optical disk, said method comprising:
(A) providing a magnetic optical recording layer comprising a thin film of an inorganic compound on an optically transparent substrate,
(B) applying a UV-ray setting resin forming mixture on said thin film, said mixture comprising:
(a) 100 parts by weight of (meth-)acrylic ester,
(b) 30–80 parts by weight of a photo polymerizable prepolymer,
(c) 10–40 parts by weight of a photo polymerization initiator and
(d) 0.1–10 parts by weight of an unreactive organic polysiloxane, and said unreactive organic polysiloxane being represented by a chemical formula:

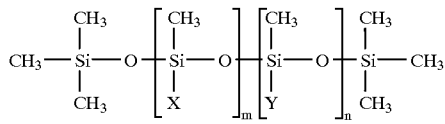

wherein m and n are respectively 0 or an integer not less than 1; and X and Y represent respectively an alkyl group, a higher fatty acid ester group, a methyl-cholorophenyl group, a straight or branched chain alkyl group whose carbon number is 4–18 or a methylphenyl group, and (C) curing said mixture by irradiating said with a UV-ray light having an illuminance of not less than 300 mW/cm$^2$ nor more than 1000 mW/cm$^2$, the quantity of said light received by said mixture being not less than 500 mJ/cm$^2$ nor more than 1500 mJ/cm$^2$, to form a protective coating layer.

11. The method of manufacturing a magneto-optical according to claim 10, wherein the UV-ray setting resin is applied to a 5–50 μm thickness on the thin film comprising inorganic compound.

12. The method of manufacturing a magneto-optical disk according to claim 10, which further comprises fatty ester at 0.1–10 parts by weight per 100 parts by weight of (meth-)acrylic ester.

13. The method of manufacturing a magneto-optical disk according to claim 10, which further comprises an organic compound having a fluoroalkyl group side chain or unsaturated aliphatic alkyl group end present in an amount of 0.1–10 parts by weight per 100 parts by weight of (meth-)acrylic ester.

14. The method of manufacturing a magneto-optical disk according to claim 10, wherein the photo polymerizable prepolymer is at least one material selected from the group consisting of urethane (meth-)acrylate and epoxy (meth-)acrylate.

15. The method of manufacturing a magneto-optical disk according to claim 10, wherein the (meth-)acrylic ester is at least one material selected from the group consisting of lauryl (meth-)acrylate, ethoxydiethyleneglycol (meth-)acrylate, phenoxyethyl (meth-)acrylate, tetrahydrofurfuryl (meth-)acrylate, isobornyl (meth-)acrylate, tricyclodecanyl (meth-)acrylate, triethylene glycol di(meth-)acrylate, neopentyl glycol di(meth-)acrylate and hexanediol di(meth-)acrylate.

16. The method of manufacturing a magneto-optical disk according to claim 10, wherein the carbon number of an aliphatic alkyl group contained in fatty ester is not less than 10 nor more than 18.

17. The method of manufacturing a magneto-optical disk according to claim 10, wherein the organic compound having a fluoroalkyl group side chain or unsaturated aliphatic alkyl end group is a fatty acid alkyl diester succinate.

18. The method of manufacturing a magneto-optical disk according to claim 10, wherein the (meth-)acrylic ester is acrylic ester or methacrylate.

19. The method of manufacturing a magneto-optical disk according to claim 10, wherein the viscosity at the temperature of 25° C. is 20–100 centipoise.

20. A magneto-optical disk, wherein a magnetic optical recording layer comprising a thin film of an inorganic compound is present on an optically transparent substrate and a protective coating layer comprising an organic compound is present on said magnetic optical recording layer, said organic compound is formed by polymerizing a UV-ray setting resin forming mixture, said mixture comprising:
(a) 100 parts by weight of (meth-)acrylic ester,
(b) 30–80 parts by weight of a photo polymerizable prepolymer,
(c) 10–40 parts by weight a photo polymerization initiator and
(d) 0.1–10 parts by weight of an unreactive organic polysiloxane, said unreactive organic polysiloxane being represented by a chemical formula:

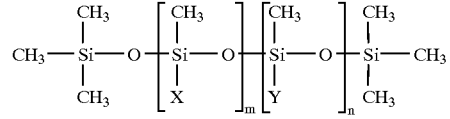

wherein m and n are respectively 0 or an integer not less than 1; and X and Y represent respectively an alkyl group, a higher fatty acid ester group, a methyl-cholorophenyl group, a straight or branched chain alkyl group whose carbon number is 4–18 or a methylphenyl group.

21. The magneto-optical disk according to claim 20, wherein the thickness of the protective coating comprising said organic compound is in the range of 5–50 μm.

22. The magnet optical disk according to claim 20, which further comprises fatty ester at 0.1–10 parts by weight to 100 parts by weight of (meta-)acrylic ester.

23. The magneto-optical disk according to claim 20, which further comprises an organic compound having a fluoroalkyl group side chain or unsaturated aliphatic alkyl end group present in an amount of 0.1–10 parts by weight per 100 parts by weight of (meta-)acrylic ester.

24. The magneto-optical disk according to claim 20, wherein the photo polymerizable prepolymer is at least one material selected from the group consisting of urethane (meth-)acrylate and epoxy (meth-)acrylate.

25. The magneto-optical disk according to claim 20, wherein the (meth-)acrylic ester is at least one material selected from the group consisting of lauryl (meth-)acrylate, ethoxydiethyleneglycol (meth-)acrylate, phenoxyethyl (meth-)acrylate, tetrahydrofurfuryl (meth-)acrylate, isobornyl (meth-)acrylate, tricyclodecanyl (meth-)acrylate, triethylene glycol di(meth-)acrylate, neopentyl glycol di(meth-)acrylate and hexanediol di(meth-)acrylate.

26. The magneto-optical disk according to claim 22, wherein carbon number of an aliphatic alkyl group contained in fatty ester is not less than 10 nor more than 18.

27. The magneto-optical disk according to claim 23, wherein the organic compound having a fluoroalkyl group side chain or an unsaturated aliphatic alkyl end group is a fatty acid alkyl diester succinate.

28. The magneto-optical disk according to claim 20, wherein the (meth-)acrylic ester is acrylic ester or methacrylate.

29. A magneto-optical disk which is a product of the following process:
(A) providing a magnetic optical recording layer comprising a thin film of an inorganic compound on an optically transparent substrate,
(B) applying a UV-ray setting resin forming mixture on said thin film, said mixture comprising:

(a) 100 parts by weight of (meth-)acrylic ester,
(b) 30–80 parts by weight of a photo polymerizable prepolymer,
(c) 10–40 parts by weight of a photo polymerization initiator and
(d) 0.1–10 parts by weight of an unreactive organic polysiloxane, and said unreactive organic polysiloxane being represented by a chemical formula:

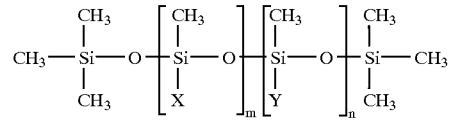

wherein m and n are respectively 0 or an integer not less than 1; and X and Y represent respectively an alkyl group, a higher fatty acid ester group, a methyl-cholorophenyl group, a straight or branched chain alkyl group whose carbon number is 4–18 or a methylphenyl group, and (C) curing said mixture by irradiating said mixture with a UV-ray light having an illuminance of not less than 300 mW/cm$^2$ nor more than 1000 mW/cm$^2$, the quantity of said light received by said mixture being not less than 500 mJ/cm$^2$ nor more than 1500 mJ/cm$^2$, to form a protective coating layer.

* * * * *